US007265713B2

(12) United States Patent
Lewis

(10) Patent No.: US 7,265,713 B2
(45) Date of Patent: Sep. 4, 2007

(54) OVERLAPPING SUBARRAY ARCHITECTURE

(75) Inventor: Gib F. Lewis, Breckenridge, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/450,063

(22) Filed: Jun. 9, 2006

(65) Prior Publication Data

US 2006/0227049 A1 Oct. 12, 2006

Related U.S. Application Data

(62) Division of application No. 11/055,006, filed on Feb. 10, 2005, now Pat. No. 7,081,851.

(51) Int. Cl.
*H01Q 3/00* (2006.01)
*G01S 3/16* (2006.01)

(52) U.S. Cl. ...................................... 342/372; 342/379

(58) Field of Classification Search ................ 342/158, 342/368, 371, 372, 379
See application file for complete search history.

(56) References Cited

U.S. PATENT DOCUMENTS

| | | | | |
|---|---|---|---|---|
| 3,842,417 | A * | 10/1974 | Williams | 342/158 |
| 4,045,800 | A | 8/1977 | Tang et al. | |
| 4,052,723 | A * | 10/1977 | Miller | 342/379 |
| 4,937,584 | A * | 6/1990 | Gabriel et al. | 342/378 |
| 5,225,841 | A | 7/1993 | Krikorian et al. | |
| 5,598,163 | A | 1/1997 | Cornic et al. | |
| 5,644,316 | A | 7/1997 | Lewis et al. | |
| 5,657,023 | A | 8/1997 | Lewis et al. | |
| 5,682,165 | A | 10/1997 | Lewis et al. | |
| 5,781,157 | A | 7/1998 | Laird et al. | |
| 5,864,317 | A | 1/1999 | Boe et al. | |
| 5,907,304 | A | 5/1999 | Wilson et al. | |

(Continued)

FOREIGN PATENT DOCUMENTS

EP 0614245 9/1994

(Continued)

OTHER PUBLICATIONS

Huang, J et al: "A Microstrip Array Feed for Land Mobile Satellite Reflector Antennas" IEEE Transactions on.

*Primary Examiner*—Dao Phan
(74) *Attorney, Agent, or Firm*—Leonard A. Alkov

(57) ABSTRACT

An embodiment of an electronically scanned array antenna includes an array of radiative elements having an array height. A plurality of separate subarrays of the radiative elements include a first row comprising a first plurality of subarrays, wherein subarrays of the first plurality of subarrays are horizontally non-overlapping with one another, and a second row comprising a second plurality of subarrays. The subarrays of the second row are arranged vertically adjacent to the subarrays of the first row, wherein subarrays of the second plurality of subarrays are horizontally non-overlapping with one another. The radiative elements of the separate subarrays are not shared with any other subarray. The subarrays of the radiative elements have subarray heights which are smaller than the array height. In another embodiment, a method for suppressing grating lobe formation in a steered subarray antenna includes applying a first illumination function to a first subarray; applying a second illumination function to a second subarray; wherein the first illumination function is different from the second illumination function.

2 Claims, 7 Drawing Sheets

U.S. PATENT DOCUMENTS

| | | | | |
|---|---|---|---|---|
| 6,043,791 | A | 3/2000 | Kinsey | |
| 6,198,449 | B1 * | 3/2001 | Muhlhauser et al. | 343/753 |
| 6,538,256 | B1 * | 3/2003 | Mankos et al. | 250/492.24 |
| 6,549,171 | B1 * | 4/2003 | Mailloux | 343/754 |
| 6,661,376 | B2 * | 12/2003 | Maceo et al. | 342/373 |
| 2003/0142015 | A1 * | 7/2003 | Boe et al. | 342/372 |
| 2004/0267127 | A1 * | 12/2004 | Abend et al. | 600/450 |
| 2005/0017917 | A1 | 1/2005 | Park et al. | |

FOREIGN PATENT DOCUMENTS

| | | |
|---|---|---|
| EP | 0831553 | 3/1998 |

* cited by examiner

FIG. 1
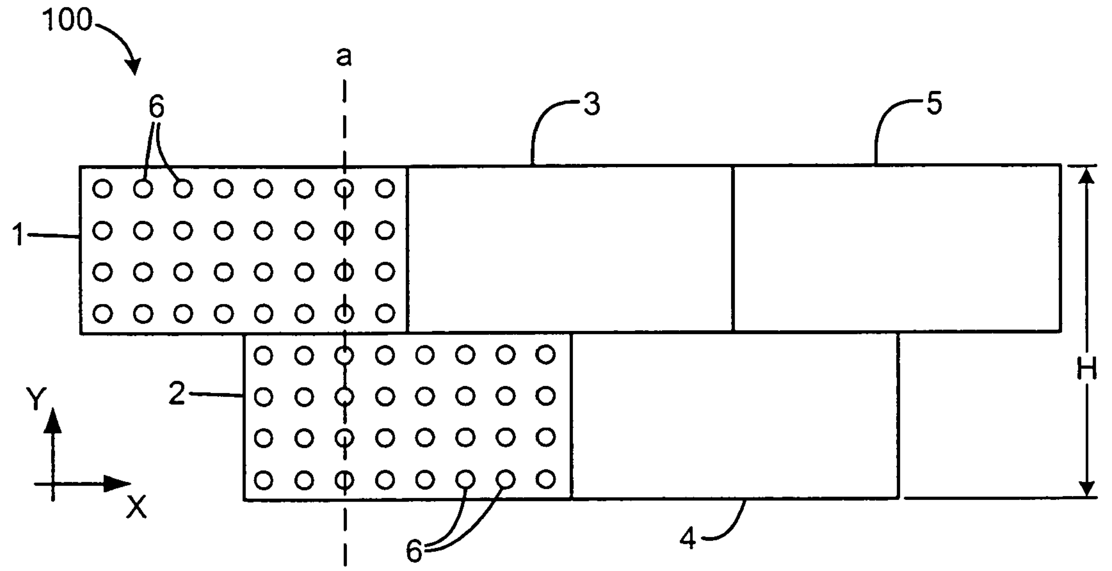
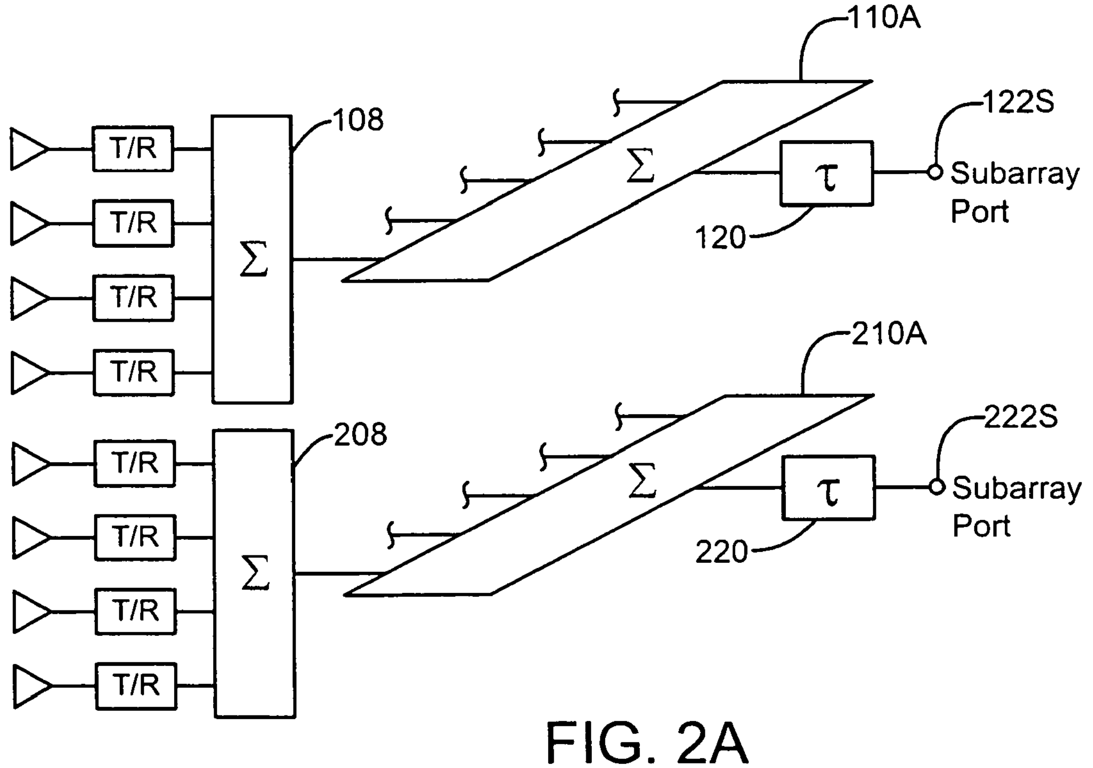
FIG. 2A

Brick △ Elevation Partitioning

Brick △ Azimuth Partitioning

OVERLAPPING SUBARRAY ARCHITECTURE

CROSS REFERENCE TO RELATED APPLICATION

This application is a Divisional Application of U.S. patent application Ser. No. 11/055,006. filed Feb. 10, 2005 now U.S. Pat. No. 7,081,851 by Gib F. Lewis and is hereby incorporated by reference herein, in its entirety.

BACKGROUND OF THE DISCLOSURE

Electronically scanned arrays (ESAs) may be set up with phase shifters servicing elements and subarrays steered by adjustable time delay. Subarray combinations may be in either an analog or digital sense. Digital combination allows limited scan, multiple full aperture beams. Beams may be steered electronically through corresponding settings in both the phase shifters and adjustable time delay elements.

An exemplary array may be arranged horizontally and be horizontally subdivided into a number of horizontally adjacent subarrays. The array elements may be arranged in horizontal rows and vertical columns. All of the subarrays typically extended the full vertical height of the array. Horizontally contiguous subarrays do not share elements with adjacent, contiguous subarrays. Horizontally overlapping subarrays may share elements with adjacent, overlapping subarrays.

For example, in the case of uniformly-sized subarrays with 50% horizontal overlap, an array which is horizontally adjacent to two other arrays will share the left half of its elements with the horizontally adjacent array on its left and the right half of its elements with the horizontally adjacent subarray on its right. In the area of overlap, the arrays overlap throughout the full height of the array. Overlapped subarrays may decrease the width of respective subarray beam patterns and may provide some degree of grating lobe suppression.

Shared-element, overlapping, full-height subarrays may be more costly to manufacture and introduce an added level of complication to achieve desired calibration of the array, in comparison with non-overlapping full-height subarrays. A complex, calibration correction term associated with a single array element location may be applied to multiple signal paths if the element is shared between two subarrays. For 50% overlap, for example, two signal paths may be required. Elemental phase shifters may perform electronic beam steering in the vertical orientation along with associated array calibration for signals in one of two subarrays by which the column of elements is shared. For the other subarray, a manifold phase shifter may apply an additional calibration setting for the signal path to the other subarray.

The additional manifold phase shifters required for more optimal calibration may increase costs and add complexity to the array architecture. Subarrays with a higher percentage of overlap result in a greater number of parallel signal paths with a corresponding requirement for additional phase shifters to achieve desired levels of calibration. As a result, array architecture may be more complex because a manifold phase shifter may be required to account for differences in signal path for shared-element signal paths in adjacent sub-arrays. The use of such overlapped subarrays may therefore result in increased complexity where optimal calibration is desired.

It may also be desirable to form an elevation difference beam. In the case of a full-height array, creating an elevation difference beam may add further architectural complexity.

SUMMARY OF THE DISCLOSURE

An embodiment of an electronically scanned array antenna includes an array of radiative elements having an array height. A plurality of separate subarrays of the radiative elements are provided and comprise a first row comprising a first plurality of subarrays, wherein subarrays of the first plurality of subarrays are horizontally non-overlapping with one another; and a second row comprising a second plurality of subarrays. The subarrays of the second row are arranged vertically adjacent to the subarrays of the first row, wherein subarrays of the second plurality of subarrays are horizontally non-overlapping with one another. Subarrays of the first plurality of subarrays partially overlap respective vertically adjacent subarrays of the second plurality of subarrays. The radiative elements of the separate subarrays are not shared with any other subarray. The subarrays of the radiative elements have subarray heights which are smaller than the array height.

In another embodiment, a method for suppressing grating lobe formation in a steered subarray antenna includes applying a first illumination function to a first subarray; applying a second illumination function to a second subarray; wherein the first illumination function is different from the second illumination function.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 illustrates an exemplary subarray architecture of an electronically scanned array radar.

FIG. 2A is a simplified block diagram illustrating an embodiment in which the respective subarrays in the top and bottom halves of the array are summed together.

DETAILED DESCRIPTION OF THE DISCLOSURE

Figure 2:
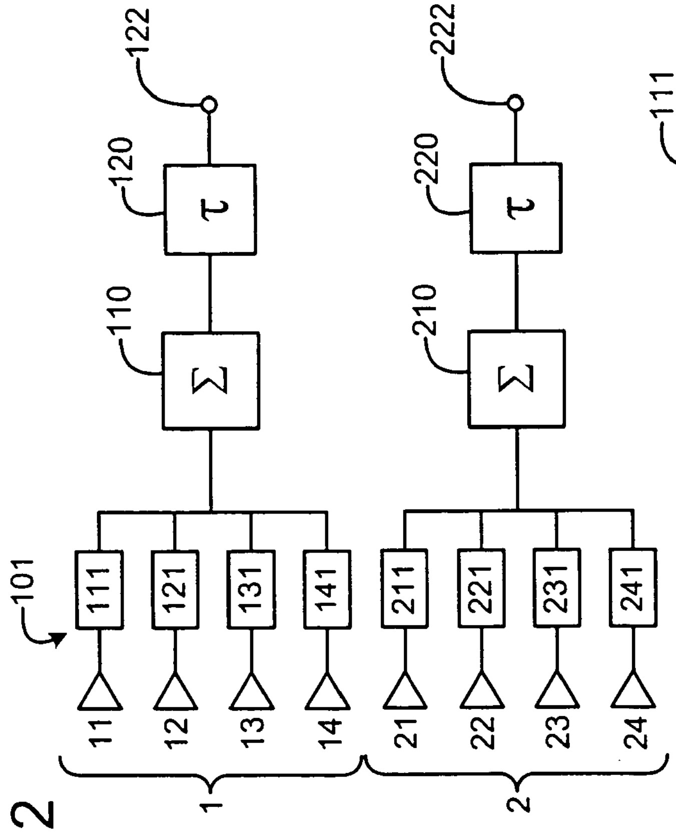
FIG. 2 illustrates a simplified block diagram of an exemplary column of array elements.

Exemplary embodiments of electronically scanned arrays, subarrays and array architectures are illustrated in FIGS. 1-8. In the following descriptions, the size, orientation and dimensions of the arrays, the size, orientation, dimensions and numbers of subarrays and subarray discrete radiative elements within those subarrays are used for convenience and by way of example only. The array radiative elements may be connected to transmit/receive modules (T/R modules). The exemplary embodiments discussed are suitable for horizontal and/or vertical extension in terms of the number of subarray discrete elements or radiative elements and in terms of the number, size, orientation, configuration and dimensions of the individual subarray elements, subarrays and the overall array.

Exemplary embodiments may provide a more readily calibrated and/or simplified array architecture for overlapped subarrays with off-frequency or limited multiple beam scan grating lobe locations and methods for producing such subarrays. FIG. 1 illustrates an exemplary embodiment of an array architecture for an electronically scanned array (ESA) 100 of radiative elements 6. The array 100 has five subarrays 1-5 arranged in a Abrick@ overlap formation.

In an exemplary embodiment, the subarrays are configured to have a vertical extent less than the full height H of the overall array. In the embodiment of FIG. 1, the subarrays are separate from one another, in that they do not share elements in common with other arrays. The subarrays 1-5 are arranged in two horizontal rows. In an exemplary embodiment, the upper row comprises separate subarrays 1, 3, 5 arranged in a non-horizontally overlapping fashion, one adjacent to the next. A lower row comprises separate subarrays 2, 4, arranged in a horizontally non-overlapping fashion, one adjacent to the next. In an exemplary embodiment, the top row is vertically non-overlapping with the lower row, in that all of the elements of the upper subarrays are above all of the elements of the lower subarrays.

In an exemplary embodiment, the subarrays 1, 3, 5 of the upper row partially overlap horizontally, i.e. along the X axis in this example, with the respective subarrays 2, 4 of the lower row. The upper subarrays partially overlap with the lower subarrays in the sense that some of the elements of the upper arrays fall in the same horizontal region along the horizontal axis as some of the elements of corresponding, respective subarrays. In an exemplary embodiment, the subarrays are contiguous with neighboring subarrays, in that the spacing between the separate, adjacent subarrays is similar to the spacing of individual elements within the various subarrays.

Subarrays 1 and 2 are shown with an exemplary four by eight arrangement of individual elements 6. Subarrays 3, 4 and 5 may have similar arrangements of elements. The number of elements in an array may typically range between tens of elements to tens of thousands of elements, or even hundreds of thousands of elements, depending on the application. The number of elements in a subarray may be the number of elements in the array divided by the number of subarrays. For an exemplary embodiment, the subarrays may have at least a statistically significant number, something like tens of elements. Each subarray in this embodiment has 50% horizontal overlap with vertically adjacent and contiguous subarrays. Adjacent subarrays do not share array elements within the region of horizontal overlap. In other words, each radiative element contributes to only one subarray.

In the exemplary embodiment of FIG. 1, for example, the odd-numbered subarrays 1, 3, 5 are arranged horizontally and located vertically above the horizontally arranged and even-numbered subarrays 2, 4. Odd-numbered subarrays 1, 3 and 5 each have a 50% horizontal overlap with respective vertically adjacent even-numbered subarrays 2, 2 and 4, and 4.

FIG. 2 is a functional block diagram depicting an exemplary array column 101 of eight array elements 11-14, 21-24 with feed/combiner manifolds 110, 210 in an exemplary embodiment of an ESA. The column represents a vertical column of array elements in a region of horizontal overlap of an odd-numbered sub-array and an even-numbered sub-array in an exemplary ESA 100 with a Abrick@ overlap structure such as the one illustrated in FIG. 1. The four upper elements 11-14 are part of an odd-numbered sub-array and the four lower elements 21-24 are part of a vertically adjacent even-numbered subarray. For example, the four upper elements 11-14 may represent four elements from sub-array 1 in FIG. 1 and the four lower elements 21-24 may represent four elements from sub-array 2 of FIG. 1. FIG>2 shows an exemplary summation of an array element column. The column corresponds to a column located along the vertical line a in FIG. 1.

In the exemplary ESA of FIG. 2, the array elements are summed up in a both horizontal and vertical sense over the top/bottom halves of the overall array.

Figure 3:
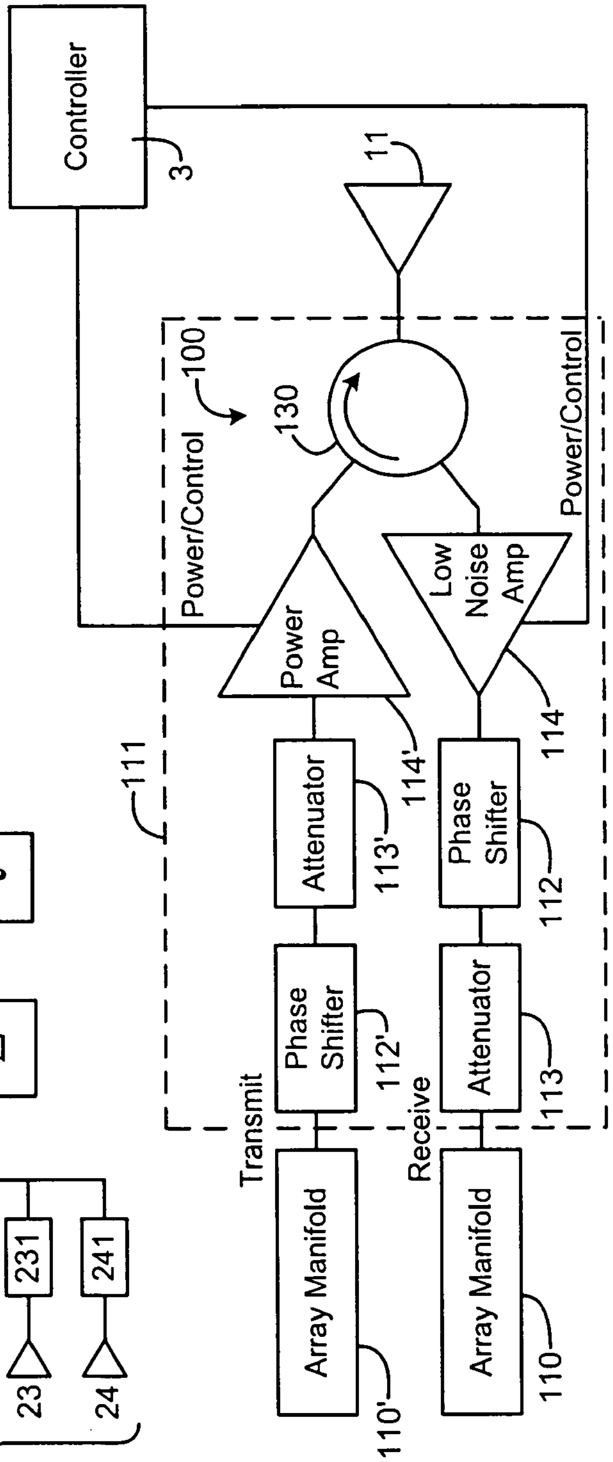
FIG. 3 illustrates a simplified block diagram of an array element with a T/R module.

In an exemplary active array embodiment, each radiative element is connected to a corresponding T/R module. Thus, in the example array column of FIG. 2, the respective elements 11-14 and 21-24 are connected to a respective T/R module 111, 121, 131, 141, 211, 221, 231, 241. FIG. 3 illustrates an exemplary embodiment of an array radiative element 11 with a T/R module 111. Received energy from element 11 is passed through circulator 130 to the receive channel comprising a receive attenuator 113, a receive phase shifter 112 and a low noise amplifier 114, to the receive array manifold 110. A controller 3 may provide power control signals to the low noise amplifier 114. The T/R module may also comprise a transmit channel comprising a transmit power amplifier 114', a transmit attenuator 113' and a transmit phase shifter 112'. A transmit array manifold 110' is connected to the input of the transmit channel. The controller may provide power control signals to the power amplifier 114'. In an exemplary embodiment, the receive manifold 110 and the transmit manifold 110' may comprise the same manifold.

Referring again to FIG. 2, the subarray elements 11-14, together with other elements of the subarray (not shown in FIG. 2) are coupled to a horizontal manifold 110 and a time delay circuit 120, and to a subarray I/O port 122. Subarray elements 21-24 are coupled to a horizontal manifold 210 and a time delay circuit 220, and to a subarray I/O port 222.

In the exemplary array architecture of FIG. 2, in which individual elements are not shared between subarrays, the elements may be summed up in a both horizontal and vertical sense over the top/bottom halves of the overall array by manifolds 110, 210. Subarray elements in the top half of the array may be combined, and subarray elements in the bottom half of the array may be combined. Signals from the sums of these halves then feed the associated time delay circuits 120, 220. FIG. 2A illustrates such an embodiment, wherein the elements in a given subarray in the top half are combined by a combiner, e.g. combiner circuit 108 and in turn the subarrays in the top half of the array are summed together by a combiner circuit 110A to provide a top half subarray port 122S. The elements in a given subarray in the bottom half are combined by a combiner, e.g. combiner circuit 208 and in turn the subarrays in the bottom half of the array are summed together by a combiner circuit 210A to provide a bottom half subarray port 222S. The amount of brick overlap is set by the choice of columns to be included in the various horizontal summations.

Complex (phase and gain) calibration corrections applied to phase shifter and attenuator settings apply to unique signal paths. These calibration corrections may be calculated as part of the initial antenna calibration. These corrections may be optimal. This exemplary brick overlap embodiment may have about a two-fold loss advantage over a full-height overlap array of similar dimensions, due to the absence of a power divider.

In an exemplary embodiment, a Abrick@ overlap configuration with non-full-height subarrays may result in a far field pattern characteristic similar to that achieved by a similar degree of overlap in an array with full-height overlap. The Abrick@ overlap configuration may achieve this result without additional manifold phase shifters, thereby simplifying the architecture and reducing manufacture costs where more optimal calibration is desired.

Sub-array Abrick@ overlap may be used in conjunction with digital element disable control to alter overall full array combined pattern characteristics. The overall array extent may be reduced by disabling certain array elements. The elements may be disabled by removing power from the transmit an/or receive amplifier. Individual elements may be disabled by removing the power from the power amplifier 113' and/or the low noise amplifier 113 (FIG. 2).

Figure 4:
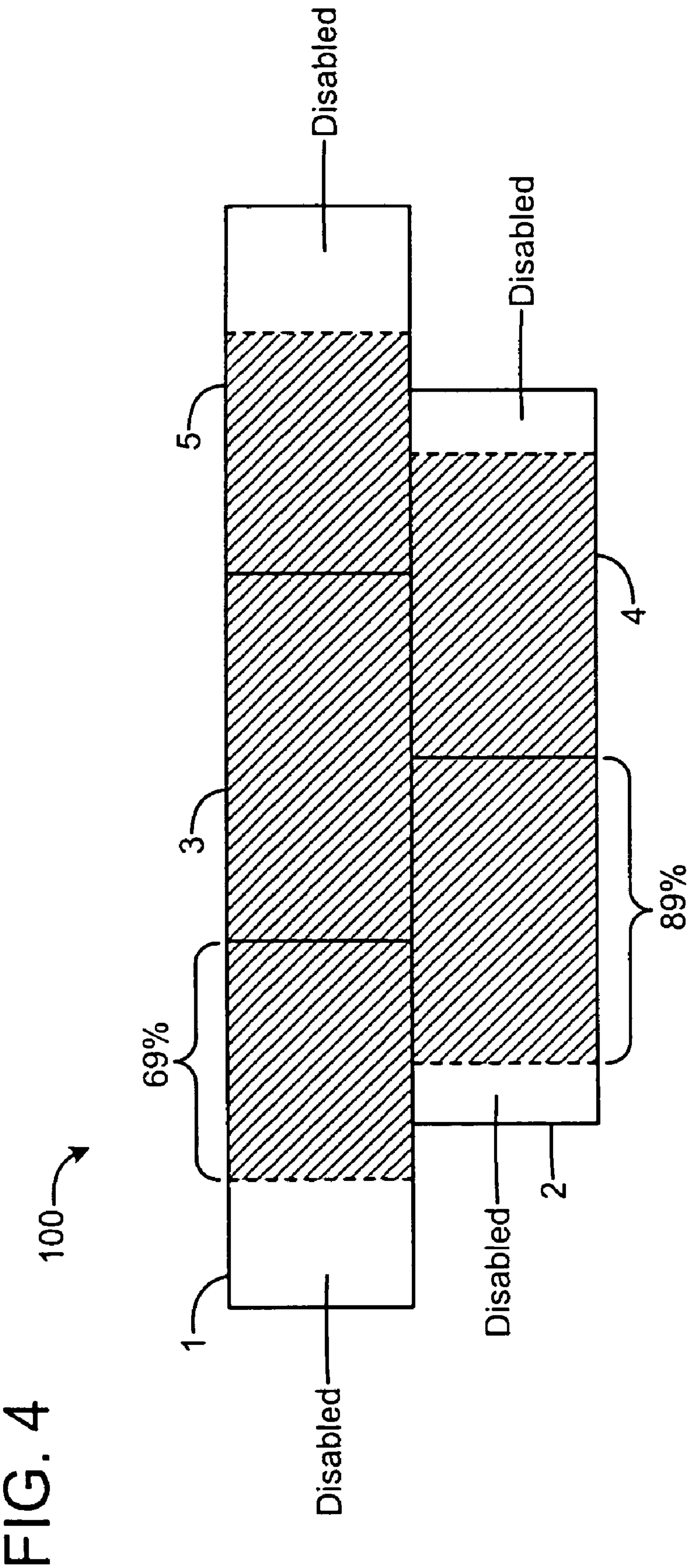
FIG. 4 illustrates an exemplary array with subarrays with effective non-equal extents.

FIG. 4 illustrates an exemplary embodiment of an array with five subarrays 1-5, the upper subarrays 1, 3, 5 overlapping 50% with vertically contiguous subarrays 2, 4. The overall array extent, with all elements being used, is 48 lambda, where lambda is the wavelength of a frequency of array operation, typically a center frequency in an operating band. In this exemplary embodiment, the overall array extent has been reduced from 48 lambda to 43 lambda, by disabling certain elements in the array, from the outside edges in one example. The fractional subarray sizes are 69% for subarrays 1 and 5, 81% for subarrays 2 and 4, and 100% for subarray 3. The non-equal extent subarrays are all uniformly illuminated, and the elements within each subarray are combined equally to form subarray signals, which are in turn combined equally. The effective overall extent of the array has been reduced to 43 lambda. The dissimilar sized sub-arrays may cause subarray pattern nulls to occur in multiple, different subarray far-field pattern locations. The multiple nulls introduced by placing non-uniform subarray sizing over a grating lobe spatial location may cause a desired grating lobe cancellation. The subarray sizes can be determined to position concentrations of subarray nulls in spatial regions where overall array grating lobes tend to form. This sort of consideration may be included as part of an array physical portioning as well as part of the overall electronic control flexibility.

Figure 5A:
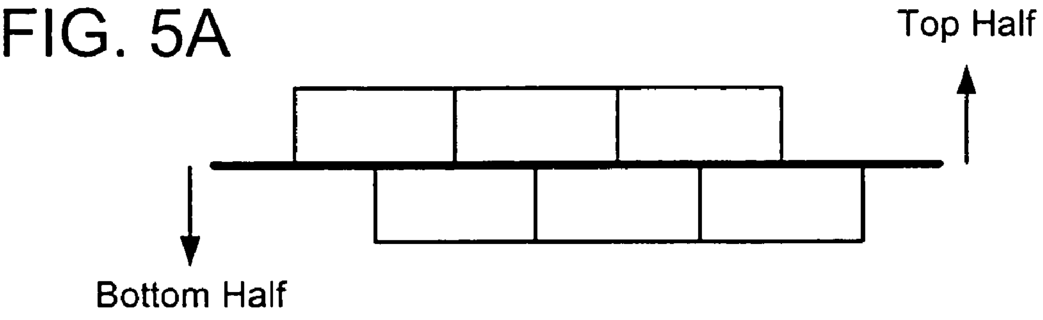
FIGS. 5A-5B illustrate exemplary embodiments of difference partitioning of an array with subarrays.
Figure 5B:
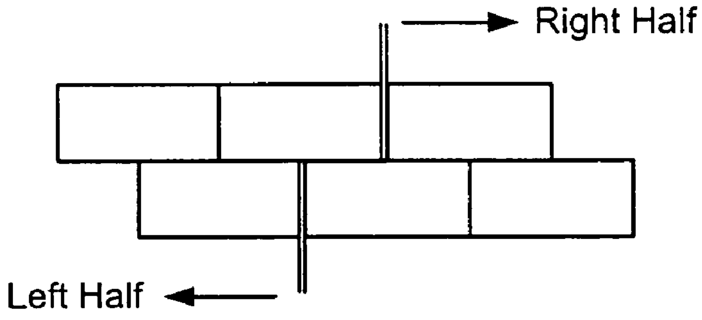
Figure 5C:
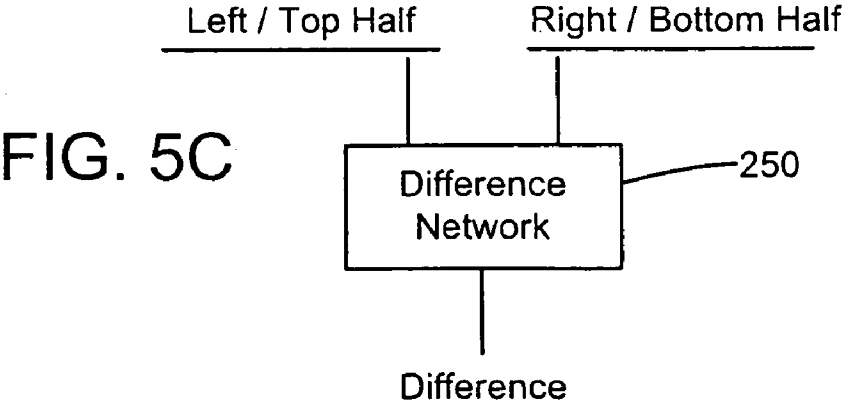
FIG. 5C schematically illustrates a monopulse difference circuitry for forming elevation or azimuth difference beams.

ABrick@ overlap architecture can also be configured to support monopulse difference partitioning, in which an aperture is separated into equal halves in a particular orientation. A difference beam may be formed by subtracting the signals, one half from the other. This is in contrast to sum beam formation where the signals from the two aperture halves are added. For amounts of overlap that give an even number of horizontal bands (e.g. 50%, 75%) overlap, a difference elevation beam can be achieved by subtracting top subarrays from the bottom. In FIG. 5A, for example, the difference elevation beam can be achieved by partitioning a six subarray array horizontally and subtracting the sum of the top subarrays 1, 2, 3 from the sum of the bottom subarrays, 4, 5, 6. Similarly, a difference azimuth beam can be formed on a left half minus right half basis for an even number of subarrays. In FIG. 5B, for example, difference azimuth beam is formed by subtracting the sum of the left subarrays 1, 2, 4 from the sum of the right subarrays 3, 5, 6. FIG. 5C schematically illustrates a monopulse difference circuitry 250 for forming a difference signal from, in the case of the embodiment of FIG. 5A, a difference elevation beam by subtracting the signal contributions from the left half of the array from those of the right half, or in the case of the embodiment of FIG. 5B, a difference azimuth beam by subtracting the signal contributions from the top half of the array from those of the bottom half.

Figure 6A:
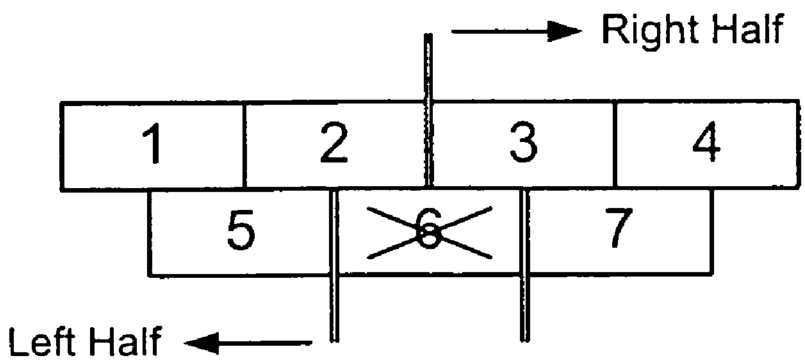
FIGS. 6A-6C illustrate exemplary embodiments of difference partitioning of arrays with subarrays.
Figure 6B:
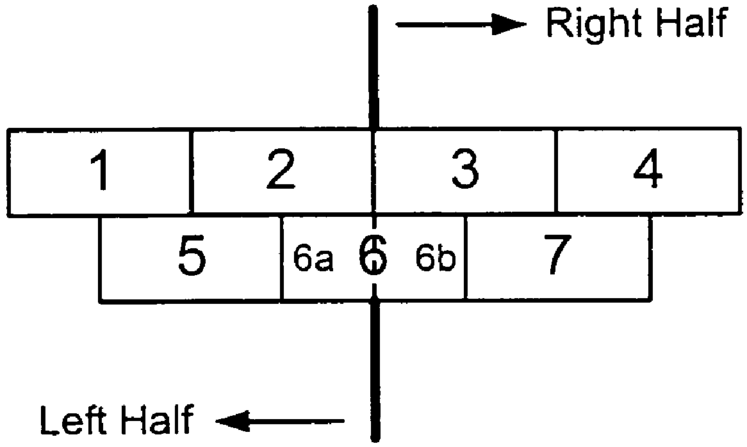
Figure 6C:
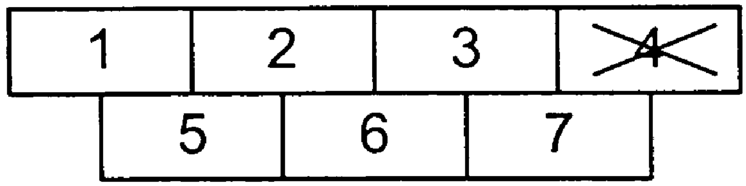

For configurations where an odd number of partitions exist in either vertical or horizontal orientation, monopulse differencing can still occur by disabling center subarrays or using portions of them. In the embodiment of FIG. 6A, for example, a seven subarray array is partitioned horizontally by disabling subarray 6, and subtracting the sum of the signal contributions from left half, subarrays 1, 2, 5, from the sum of the signal contributions from the right half, subarrays 3, 4, 7. Similarly, FIG. 6B illustrates an exemplary horizontal partitioning scheme for a sever subarray array in which the sum of contributions from the left half 1, 2, 5 and the left half of 6 (6*a*) are subtracted from the sum of contributions from the right half, 3, 4, 7 and the right half of 6 (6*b*). Elevation partitioning in an odd-numbered array can be accomplished by disabling one of the subarrays on whichever one of the top half or bottom half has the most subarrays. In the embodiment of FIG. 6C, for example, the sum of the signal contributions from subarrays 1, 2, 3 are subtracted from the sum of the signal contributions from the bottom subarrays 5, 6 and 7, with the elements in subarray 4 disabled.

Exemplary embodiments of an ESA provide overlapped subarray architecture with simplified beamformer features. These embodiments may also provide flexibility in tuning subarray length and may be readily scalable to a variety of subarray sizes and configurations with varying degrees of overlap. The number of subarrays in the exemplary embodiments illustrated here are not exclusive. The subarray architecture is suitable to scaling to any arbitrary length, height, configuration and degree of subarray overlap. The particular embodiments of partitioning illustrated herein are exemplary only.

In further exemplary embodiments, grating lobe suppression may be accomplished with digital control rather than fixed by array/subarray physical architecture, design and/or fabrication. In an exemplary embodiment, changing aperture illuminations as a function of ESA beam displacement may be used for tailored grating lobe suppression. The tailored grating lobe suppression may be used at wider ESA scan positions and may be more desirable at wider ESA scan angles. This allows aperture illuminations offering greater system sensitivity to be used for beam positions of modest ESA beam displacement. Depending on aperture illumination functions involved, and system operation, system sensitivity improvements associated with this technique can be shown.

Dynamic taper adjustment of an active electronically scanned array (ESA) may mitigate the onset of overall combined array pattern grating lobes that may result from operational conditions which are stressing, in the sense that array performance is limited by far-field radiation pattern grating lobe formation. These stressing operational conditions are typically the off-set frequency condition presented by wide instantaneous bandwidth operation and by limited, scan multiple beam formation. The magnitude of the grating lobe formation resulting from either of these stressing conditions changes depending on ESA scan position and array/subarray configuration.

Uniform aperture illumination provides radiation pattern sidelobes with equal null-to-null width. Mainlobe null-to-null width is twice that of the sidelobes. Pattern nulls in an overall full array combined beam may be set, in part, by the subarray pattern nulls. Using dissimilar subarray tapers places nulls in multiple locations. Null locations may be predicted or determined for grating lobe suppression, and tapers adjustment of subarray tapers can be dynamically made with an active ESA that cancels off-frequency induced full array grating lobes.

Aperture tapers are used to reduce peak radiation pattern sidelobes. These tapers typically reduce the excitation toward aperture edges. Along with reduced sidelobes comes a broadened mainlobe with reduced directive gain. Different taper families distort sidelobe null-to-null spacing in different ways. The phrase "taper families" in this context traditionally applies to mathematically related adjustment of array element excitation for purposes of adjusting array far-field pattern characteristics. These mathematically related characteristics typically showed up as using the same set of equations/optimizations with a different set of input constants. A taper family is typically distinguished by a particular name. A short list of examples of traditional taper families is as follows: Taylor, Blackman, Hamming, Hamming, Tukey. Traditional taper families have tended to focus on amplitude-only element excitation adjustment. More modern tapers tend to adjust the full complex (phase and gain) characteristics of array elements, e.g. by assorted optimization based on mathematics.

Even more modern techniques tend to employ all of the above and also include computer optimizations. Some families offer comparatively constant sidelobe null-to-null width. Other families offer non-uniform sidelobe widths which can vary as a function of angle away from mainlobe.

Applying different tapers to different ones of the subarrays may be combined to produce a resultant far-field pattern that demonstrates very irregular null spacing. If different tapers are chosen to provide densely spaced nulls in the region of undesired grating lobe formation, grating lobe cancellation may result. Thus tapers from various families can be selected to provide grating lobe cancellation in desired locations.

Tapers may be determined to have even and closely spaced far field null locations in regions where grating lobe suppression is desired. The closely spaced nulls provide grating lobe cancellation. The dissimilar weights may be arranged in the overall aperture such that lower sidelobe weights are closer to the edge of the aperture.

Tapers for use in certain, expected operational conditions may be pre-determined to have even and closely spaced far field null locations in regions where grating lobe formation is expected and where grating lobe suppression will be desired. A digital library of expected operational conditions and respective families of tapers with desirable grating lobe suppression characteristics may be stored in memory of a controller.

Figure 7:
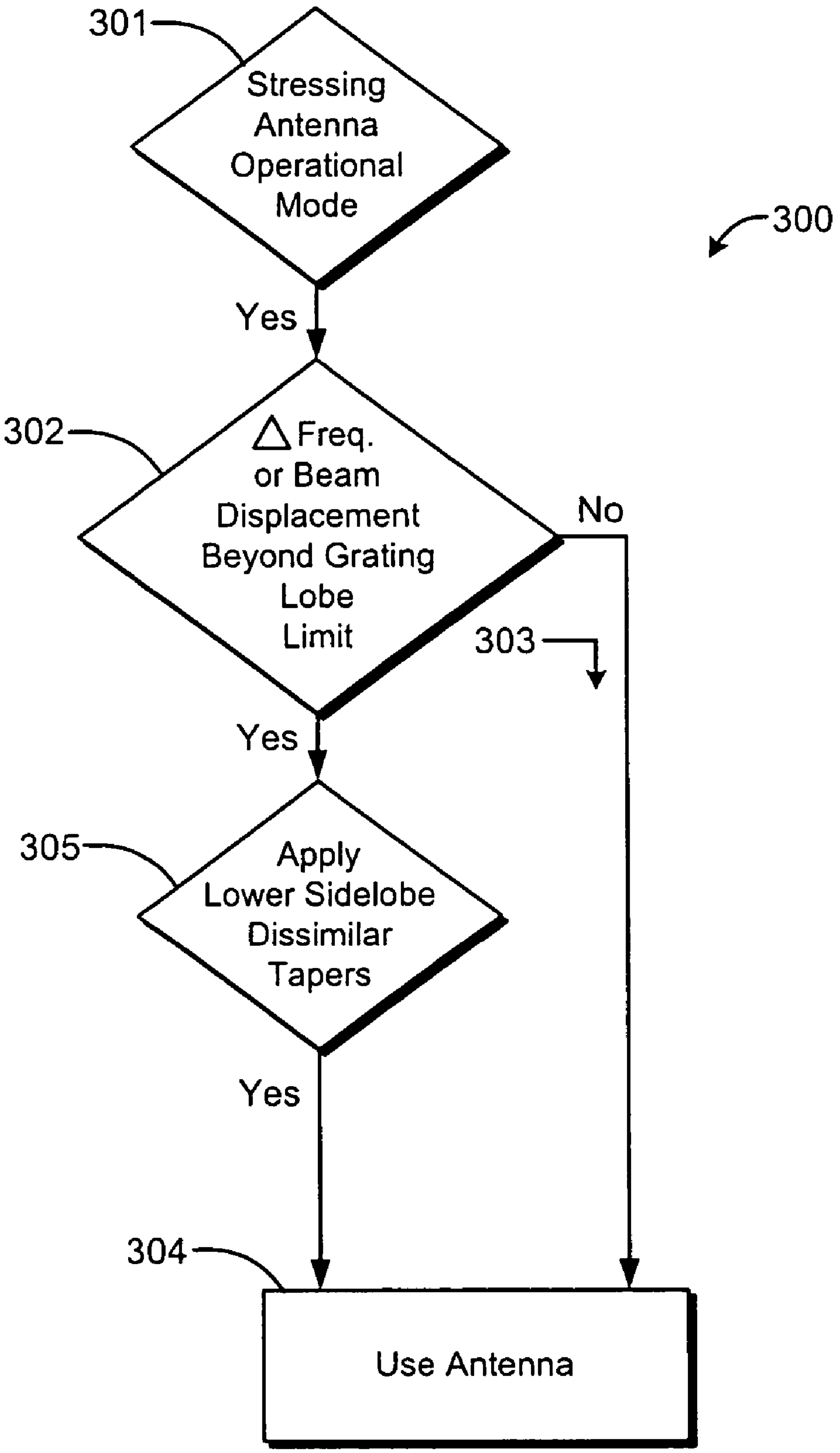
FIG. 7 illustrates an exemplary method of applying dissimilar tapers to subarrays of an array.

FIG. 7 illustrates an exemplary method 300 of applying dissimilar tapers. If the antenna operational mode is stressed at 301, then a controller determines whether the delta frequency or beam displacement is beyond a grating lobe limit at 302. If it is not (303), then the antenna is used at 304 without sidelobe dissimilar tapers. If it is, then the controller applies lower sidelobe dissimilar tapers at 305 before using the antenna 304.

In a typical implementation, the method of FIG. 7 may be applied to antenna architectures that are stressed in a predetermined way. This would typically be the case for wider ESA scan angles with a relatively large instantaneous bandwidth or multiple receive beam formation. The process may employ predetermined tapers or equations in software with coefficients that are adjusted based on operating conditions. This is really a matter of implementation of possibly synergistic approaches, e.g. selecting lookup tables or equations with programmable inputs, or both.

The adjustment may be made whenever grating lobe suppression is required. For example, when ESA beam positions are near array broadside, low loss tapers may be selected where grating lobe suppression concerns may be minimized. The beam displacement may not be beyond the grating lobe limit and the antenna may be used without applying lower sidelobe dissimilar tapers. As scan angles are increased, and off-frequency grating lobes increase, subarray tapers may be adjusted to place nulls at undesirable grating lobe locations. The beam displacement or frequency difference may be beyond the grating lobe limit and dissimilar sidelobe tapers may be applied. Typically it is known ahead of time when an adjustment may be required. Whether or not it is actually required depends on the environment that the radar is operated in; conditions such as clutter characteristics, and additional outside interference also come into play. Improvement benefits due to application of the adjustment techniques may be observed in some applications by enabling and disabling these techniques. The techniques can be used in conjunction with other interference cancellation techniques.

Figure 8:
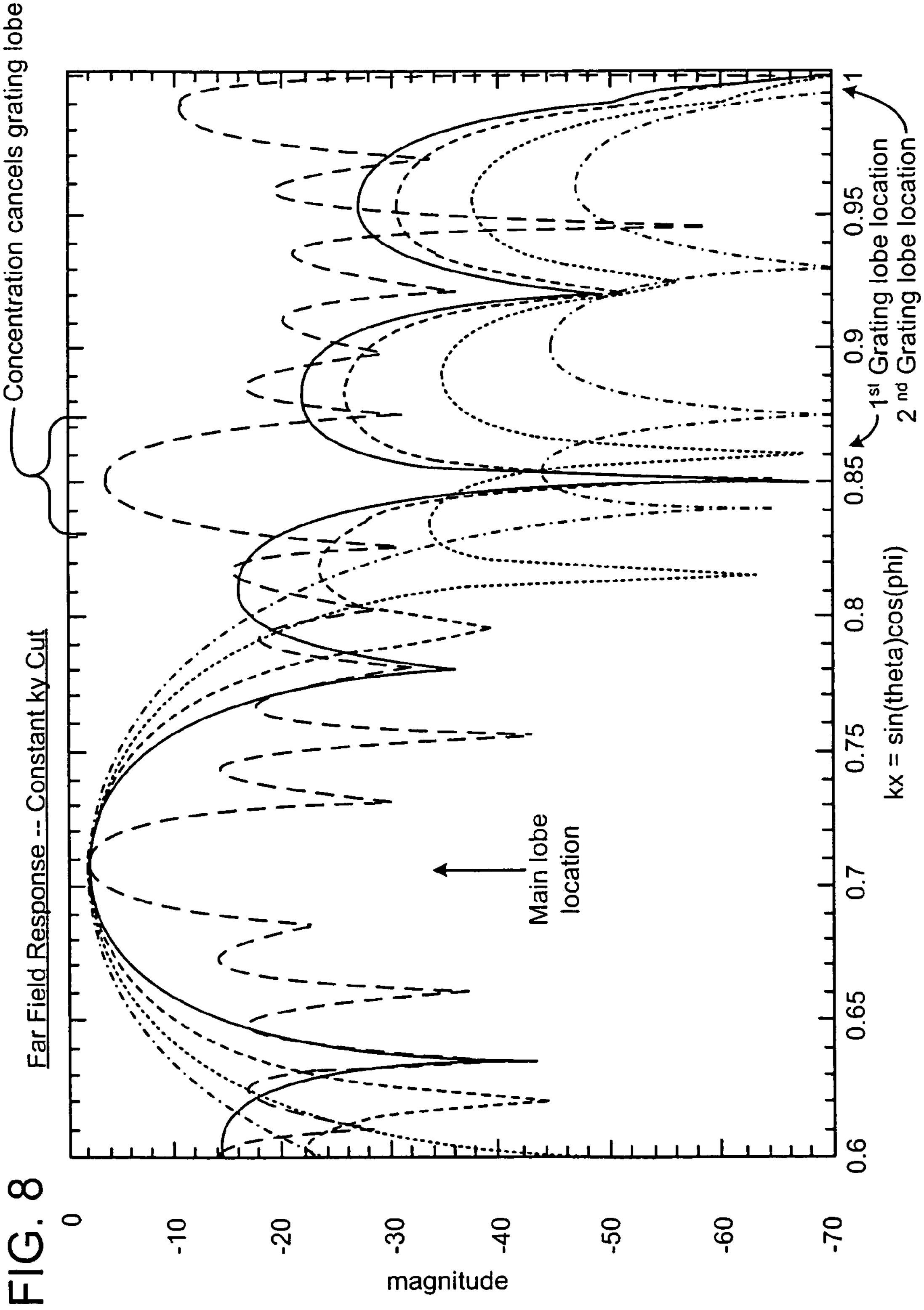
FIG. 8 illustrates an exemplary far field response of subarrays having dissimilar tapers applied to them.

FIG. 8 illustrates far field patterns and array factor from exemplary subarray of an array, with the subarrays having different tapers applied to them. In this exemplary embodiment, the array has five full-height, 50% overlap subarrays with an aperture of 48 wavelength extent. The subarray tapers shown are a −20, −30, −40 dB Taylor weights, and show effects of subarray null width increase with increasing taper. The example tapers were chosen for convenience and are not meant to imply an optimal taper selection. Examination of the first and second subarray pattern null locations shows numerous nulls in the vicinity of the first array-factor lobe repeat (where kx approximately equals about +/−0.1). A −30 dB Taylor weight is used on each of the 5 subarrays.

Additionally, a −40 dB Taylor weight is placed across the 5 subarray beam ports. Optimal tapers for this technique tend to place nulls at each grating lobe location. Further, the optimal taper set may include adjustable subarray null location while maintaining regular subarray null-to-null spacing. Regular subarray null-to-null spacing allows the same null determined grating lobe cancellation effect for each of the periodic full array grating lobes.

FIG. 8 shows non-equal sidelobe null widths for an individual weighted subarray pattern. That is, sidelobe nulls are more closely spaced in the mainlobe vicinity. Further away from the mainlobe, the nulls are more widely spaced. These more widely spaced null positions tend to fall at the same locations even across dissimilar Taylor weights. This similarity of dissimilar Taylor weight null locations lessens grating lobe suppression in regions far from the mainlobe.

Exemplary subarray weights may be, subarray 1 and 5, −40 dB Taylor; subarrays 2 and 4 −30 dB Taylor; and subarray 3, −30 dB Taylor. Additionally, a −40 dB Taylor weight may be applied at the subarray ports. The effects of pattern nulling described earlier can be seen in the vicinity of kx=0.575.

An exemplary taper selection for a seven subarray per array configuration is the following, where taper No 4 corresponds to the lowest subarray sidelobe levels, and taper No 1 corresponds to uniform illumination:

Subarray No: 1 2 3 4 5 6 7

Taper No: 4 3 2 1 2 3 4

Choice of other weight families with different null spacings across the full far field pattern improves grating lobe suppression in regions far from the mainlobe as well as close in. The weight families used are selected by comparing the null locations associated with the weights with the locations of grating lobes.

Electronic subarray extent control can be used in conjunction with subarray electronic taper control to provide multiple degrees of freedom in grating lobe control. This grating lobe control is useful for either wide instantaneous bandwidth, off-frequency, or limited scan multiple beam operation. It can be employed dynamically as the need arises. Using a subarray Abrick@ overlap architecture may simplify the architecture, thereby reducing costs of manufacture, and provide a more readily calibrated array.

In an exemplary embodiment, dynamic taper adjustment control may also be applied to horizontally overlapping, vertically separate, adjacent and/or contiguous subarrays.

It is understood that the above-described embodiments are merely illustrative of the possible embodiments which may represent principles of the present invention. Other arrangements may readily be devised in accordance with these principles by those skilled in the art without departing from the scope and spirit of the invention.

What is claimed is:

1. An electronically scanned array radar system. comprising:

a controller with a memory;

a set of parameters identifying an operating condition under which undesirable grating lobes will form, the list of parameters being stored in memory;

an array of radiative elements having an array height, with a plurality of separate subarrays of said radiative elements, wherein the plurality of separate subarray comprises at least a first subarray and a second subarray, wherein said first subarray and said second subarray have subarray heights which are smaller than said array height, said first subarray is vertically non-overlapping with the second subarray, said first subarray partially horizontally overlaps the second subarray, and said radiative elements of said separate subarray are not shared with any other subarray; and a set of families of tapers associated with respective subarrays, at least a first taper of the family of tapers being different from a second taper of the family of tapers, each taper creating nulls in the far field response of their respective subarrays, the nulls being in the vicinity of grating lobes which form in the operating condition, the set of tapers being stored in the memory.

2. The electronically scanned array radar system of claim 1, wherein the controller applies the family of tapers to the subarrays when the operating conditions are met.

* * * * *